United States Patent
Himmelmann et al.

(10) Patent No.: US 6,677,015 B2
(45) Date of Patent: *Jan. 13, 2004

(54) MOLDING COMPOSITION WITH GOOD CAPABILITY FOR BLOW MOLDING

(75) Inventors: Martin Himmelmann, Haltern (DE); Wilfried Bartz, Marl (DE); Franz-Erich Baumann, Duelmen (DE); Guido Schmitz, Duelmen (DE); Georg Oenbrink, Duelmen (DE); Harald Haeger, Recklinghausen (DE); Ralf Richter, Recklinghausen (DE)

(73) Assignee: Degussa AG, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/021,355

(22) Filed: Dec. 19, 2001

(65) Prior Publication Data

US 2002/0119267 A1 Aug. 29, 2002

(30) Foreign Application Priority Data

Dec. 21, 2000 (DE) .......................... 100 64 338

(51) Int. Cl.[7] ............................. B32B 1/02; B32B 27/34; C08G 63/44; C08L 77/06; C08L 79/02
(52) U.S. Cl. ................ 428/35.7; 428/474.4; 428/474.9; 525/420; 525/435; 528/288; 528/272; 528/291; 528/292; 524/600; 524/602; 524/606
(58) Field of Search ............................ 428/35.7, 474.4, 428/474.9; 525/420, 435; 528/288, 272, 291, 292; 524/600, 602, 606

(56) References Cited

U.S. PATENT DOCUMENTS

| | | | |
|---|---|---|---|
| 2,615,863 A | 10/1952 | Flory | 260/78 |
| 3,442,975 A | 5/1969 | Cawthon et al. | 260/857 |
| 5,859,148 A | 1/1999 | Borggreve et al. | 525/420 |
| 5,959,069 A | 9/1999 | Glueck et al. | 528/332 |
| 6,033,749 A * | 3/2000 | Hata et al. | 428/36.7 |
| 6,355,358 B1 * | 3/2002 | Boer et al. | 428/474.4 |
| 6,361,641 B1 * | 3/2002 | Blong et al. | 156/243 |

FOREIGN PATENT DOCUMENTS

| | | |
|---|---|---|
| DE | 0S 1 915 772 | 10/1969 |
| DE | OS 196 54 179 A1 | 6/1998 |
| DE | 198 59 929 | 6/2000 |
| EP | 0 377 259 | 7/1990 |
| EP | 0 672 703 A1 | 9/1995 |
| GB | 1210790 | 10/1970 |
| WO | WO 96/35739 | 11/1996 |
| WO | WO 97/46747 | 12/1997 |
| WO | WO 99/64496 | 12/1999 |

OTHER PUBLICATIONS

John M. Warakomski, "Synthesis and Properties of Start–Branched Nylon 6". Chem. Mater. 1992, 4, 1000–1004.

* cited by examiner

Primary Examiner—Harold Pyon
Assistant Examiner—Chris Bruenjes
(74) Attorney, Agent, or Firm—Oblon, Spivak, McClelland, Maier & Neustadt, P.C.

(57) ABSTRACT

A molding composition of at least 50% by weight of a polyamine-polyamide copolymer obtained from 0.05 to 2.5% by weight of a polyamine having at least 4 nitrogen atoms and having a viscosity of at least 5 000 Pa•s at 250° C. and at a shear rate of 0.1 l/s, and having a viscosity ratio of at least 7 at 250° C., when the melt viscosities at shear rates of 0.1 l/s and 100 l/s are compared with one another, has high melt stiffness and is easy to cut, and performs well in blow molding.

12 Claims, No Drawings

MOLDING COMPOSITION WITH GOOD CAPABILITY FOR BLOW MOLDING

BACKGROUND OF THE INVENTION

1. Field of the Invention

The invention relates to a molding composition based on a polyamine-polyamide copolymer and an article produced from the same by blow molding.

2. Discussion of the Background

The blow molding process is usually used to produce hollow articles, such as bottles, tanks, tubing, etc. In traditional extrusion blow molding, the parison is extruded vertically downward. Once it has reached a sufficient length, is shaped in a mold by injecting air, to obtain the finished part. More recent developments in the engineering of the machinery have led to other versions of blow molding, e.g. to 3D blow molding, in which an appropriate handling unit places the parison into a three-dimensional cavity. Another version of the process which should be mentioned is suction blow molding, in which the parison is sucked into a closed cavity. The following references describe conventional blow molding processes: F. Hensen, W. Knappe, H. Potente (ed.), Handbuch der Kunststoff-Extrusionstechnik II/Extrusionsanlagen [Handbook of plastics extrusion technology II/extrusion systems], Carl Hanser Verlag Munich, Vienna 1986, Chapter 12, and F. Schüller, Plastverarbeiter, Volume 49, No. 7, pp. 56–59. Coextrusion blow molding is described in W. Daubenbüchel, Kunststoffe 82 (1992), pp. 201–206.

A common feature of these blow molding processes is that high melt stiffness is required to minimize parison drawdown caused by gravity. However, in the case of polyamide it is impossible to provide the underlying molding composition with sufficiently high melt stiffness, in particular for large moldings, at reasonable melt viscosities. Another problem here is that, compared to polyethylene, for example, polyamides are more difficult to cut. This causes major problems when cutting or break-off methods are used to remove "flash".

To overcome the above problems, various polymer systems have been suggested. For example, branched copolymers based on polyamine and polyamide are known, and may be prepared, for example, by cationic polymerization of caprolactam in the presence of polyethyleneimine hydrochloride dendrimers as core molecule (J. M. Warakomski, Chem. Mater. 1992, 4, 1000–1004). Compared with linear nylon-6, nylon-6 dendrimers of this type have markedly reduced melt viscosity and solution viscosity, but unchanged tensile strength, stiffness, melting points, enthalpies of fusion, and oxygen-barrier action.

Graft copolymers based on polyvinylamine and polyamide are known from U.S. Pat. No. 2,615,863. U.S. Pat. No. 3,442,975 describes graft copolymers prepared by polymerizing lactams in the presence of high-molecular-weight polyethyleneimine.

DE-A 19 15 772 describes blends made from a polyimine-polyamide graft copolymer and from a polyolefin, and/or polyester, these can be processed to give fibers which are easy to dye.

DE-A 196 54 179 describes H-shaped polyamides which are prepared from lactams and, respectively, aminocarboxylic acids, and from an at least trifunctional amine, and from bifunctional carboxylic acids and monofunctional carboxylic acid, there being a particular ratio between the two latter and between these and the functional groups of the at least trifunctional amine. The products have improved melt stability.

WO-A 96/35739 moreover describes specific star-shaped branched polyamides whose melt viscosity has only low dependence on shear rate.

Finally, the German patent applications 100 05 640.7 and 100 05 639.3, which are not prior publications, describe polyamine-polyamide graft copolymers. It is apparent from the above references that copolymers of this type generally have good flowability.

SUMMARY OF THE INVENTION

It is an object of the present invention to provide a polyamide molding composition which has high melt stiffness and is suitable for blow molding applications and which when compared with polyamide molding compositions conventionally used, is easier to cut.

This and other objects have been achieved by the present invention the first embodiment of which includes a molding composition, comprising:

at least 50% by weight of a polyamine-polyamide copolymer;

wherein said molding composition is obtained from the following monomers:
  a) from 0.05 to 2.5% by weight of a polyamine having at least 4 nitrogen atoms based on the polyamine-polyamide copolymer, and
  b) a polyamide-forming monomer selected from the group consisting of a lactam, a ω-aminocarboxylic acid, an equimolar combination of a diamine and a dicarboxylic acid and a mixture thereof, wherein the polyamine-polyamide copolymer has the following properties:
  a viscosity of at least 5 000 Pa•s at 250° C. and at a shear rate of 0.1 1/s; and
  a viscosity ratio of at least 7 at 250° C., when the melt viscosities at shear rates of 0.1 1/s and 100 1/s are compared with one another.

The invention further provides for a method of blow molding the above composition and for a blow-molded article.

DETAILED DESCRIPTION OF THE INVENTION

Surprisingly, it was possible to achieve the above object by way of a molding composition comprising at least 50% by weight of a polyamine-polyamide copolymer and which is prepared from the following monomers:

a) from 0.05 to 2.5% by weight, preferably from 0.1 to 2.0% by weight, and particularly preferably from 0.2 to 1.5% by weight, based on the polyamine-polyamide copolymer, of a polyamine having at least 4, preferably at least 8, and particularly preferably at least 11, nitrogen atoms, and
  b) a polyamide-forming monomer selected from a lactam, a ω-aminocarboxylic acid, and/or an equimolar combination of a diamine and a dicarboxylic acid, wherein the polyamine-polyamide copolymer has the following properties:
  a viscosity of at least 5 000 Pa•s at 250° C. and at a shear rate of 0.1 1/s; and
  a viscosity ratio of at least 7 at 250° C., when the melt viscosities at shear rates of 0.1 1/s and 100 1/s are compared with one another.

Preferred examples of classes of substances which may be used as polyamine are the following:

dendrimers, such as

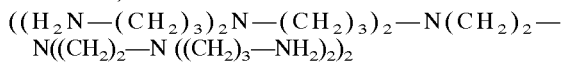

(DE-A-196 54 179), or tris(2-aminoethyl)amine, N,N-bis(2-aminoethyl)-N',N'-bis[2-[bis(2-aminoethyl) amino]ethyl]-1,2-ethanediamine, 3,15-bis(2-aminoethyl)-6,12-bis[2-[bis(2-aminoethyl) amino]ethyl]-9-[2-[bis[2 -bis(2-aminoethyl) amino] ethyl]amino]ethyl]-3,6,9,12,15-pentaazaheptadecane-1,17-diamine (J. M. Warakomski, Chem. Mat. 1992, 4, 1000–1004);

branched polyethyleneimines obtained by polymerizing aziridines (Houben-Weyl, Methoden der Organischen Chemie [Methods of organic chemistry], Vol. E20, pp. 1482–1487, Georg Thieme Verlag Stuttgart, 1987) and generally having the following distribution of amino groups:

from 25 to 46% of primary amino groups,
from 30 to 45% of secondary amino groups, and
from 16 to 40% of tertiary amino groups.

In the preferred case, the polyamine has a number-average molecular weight $M_n$ of at least 146 g/mol, more preferably at least 500 g/mol, and most preferably at least 800 g/mol. In addition, the number-average molecular weight is not more than 20 000 g/mol, more preferably not more than 10 000 g/mol, and most preferably not more than 5 000 g/mol.

Lactams and, respectively, ω-aminocarboxylic acids which may be used as polyamide-forming monomers contain from 4 to 19 carbon atoms, in particular from 6 to 12 carbon atoms. Particular preference is given to the use of ε-caprolactam, ε-aminocaproic acid, caprylolactam, ω-aminocaprylic acid, laurolactam, ω-aminododecanoic acid, and/or ω-aminoundecanoic acid.

Preferred examples of combinations of diamine and dicarboxylic acid are hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid, and dodecamethylenediamine/2,6-naphthalenedicarboxylic acid. It is also possible to use any other combination, such as decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/ω-aminoundecanoic acid, decamethylenediamine/dodecanedioic acid/laurolactam, decamethylenediamine/terephthalic acid/laurolactam, or dodecamethylenediamine/2,6-naphthalenedicarboxylic acid/laurolactam.

In one preferred embodiment, the polyamine-polyamide copolymer is prepared with the additional use of an oligocarboxylic acid selected among from 0.01 to about 0.5 mol % of a dicarboxylic acid and from 0.01 to about 0.2 mol % of a tricarboxylic acid, based in each case on the entirety of the polyamide-forming monomers of b). When the equivalent combination of diamine and dicarboxylic acid is used, calculation of these proportions includes each of these monomers individually. The concomitant use of the oligocarboxylic acid markedly improves not only rheological properties but also resistance to solvents and to fuels. In particular hydrolysis resistance, alcoholysis resistance, stress-cracking resistance, swelling performance and the associated dimensional stability, and diffusion-barrier action are markedly improved.

The oligocarboxylic acid may be any di- or tricarboxylic acid having from 6 to 24 carbon atoms, for example adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid, and/or trimellitic acid.

Preferred regulators which may be optionally used, are aliphatic, alicyclic, aromatic, and/or alkylaryl-substituted monocarboxylic acids having from 3 to 50 carbon atoms, for example lauric acid, unsaturated fatty acids, acrylic acid, or benzoic acid. The use of these regulators can reduce the concentration of amino groups without altering the form of the molecule. This method can also introduce functional groups, such as a double or a triple bond etc.

The polyamine-polyamide copolymers of the present invention may be prepared by a variety of processes.

One way is to charge lactam and, respectively, ω-aminocarboxylic acid and polyamine together and to carry out the polymerization or, respectively, the polycondensation. The oligocarboxylic acid may be added either at the start or during the course of the reaction.

However, a preferred process has two stages in which first the lactam cleavage and prepolymerization is carried out in the presence of water (an alternative being the direct use and prepolymerization of the corresponding ω-aminocarboxylic acids or, respectively, diamines and dicarboxylic acids). The polyamine is metered in during the second step. The oligocarboxylic acid which may be optionally used is metered in during or after the prepolymerization. The pressure on the mixture is then reduced at temperatures of from 200 to 290° C., and polycondensation takes place in a stream of nitrogen or in vacuo.

Another preferred process is hydrolytic degradation of a polyamide to give a prepolymer and simultaneous or subsequent reaction with the polyamine. The polyamides used are preferably those in which the end-group difference is approximately zero, or in which the optionally used oligocarboxylic acid has previously been incorporated by polycondensation. However, the oligocarboxylic acid may also be added at the start of, or during the course of, the degradation reaction.

These processes can yield polyamides with an ultrahigh level of branching and with acid values below 40 mmol/kg, preferably below 20 mmol/kg, and particularly preferably below 10 mmol/kg. Approximately complete conversion is achieved after as little as from one to five hours of reaction time at temperatures of from 200° C. to 290° C. The reaction time includes all values and subvalues therebetween, especially including 1.5; 2; 2.5; 3; 3.5; 4 and 4.5 hours. The reaction temperature includes all values and subvalues therebetween, especially including 210, 220, 230, 240, 250, 260, 270 and 280° C.

Optionally, a vacuum phase lasting a number of hours may be appended as another step of the process. This phase takes at least four hours, preferably at least six hours, and particularly preferably at least eight hours, at from 200 to 290° C. After an induction period of a number of hours, an increase in melt viscosity is then observed. This is likely to be attributable to a reaction of terminal amino groups with one another, with elimination of ammonia and chain-linkage.

If there is a desire not to complete the reaction in the melt, solid-phase postcondensation of the polyamide with an ultra high level of branching is also possible.

The viscosity at 250° C. at a shear rate of 0.1 1/s is preferably at least 7 000 Pa•s, particularly preferably at least 9 000 Pa·s, and very particularly preferably at least 12 000 Pa·s. It is determined in a cone-and-plate viscometer according to ASTM D4440-93.

The viscosity ratio determined by comparing the melt viscosities at shear rates of 0.1 1/s and 100 1/s at 250° C. is preferably at least 9, and particularly preferably at least 12. It can be influenced firstly via the nature and amount of the polyamine, and secondly via any concomitant use of an oligocarboxylic acid. The general rule is that the higher the viscosity ratio the more branched the copolyamide.

Besides the polyamine-polyamide copolymer, the molding composition may also comprise a total of up to about 50% by weight of additives selected from a) a conventional impact modifier for polyamides, for example an ethylene-α-olefin copolymer (in particular EPM and EPDM) or a styrene/ethylene-butylene block copolymer (in particular SEBS), where in all of these cases the impact modifier also bears a functional group, e.g. anhydride, or else an α-olefin-acrylate terpolymer with an olefinically unsaturated anhydride, glycidyl acrylate or glycidyl methacrylate as third component;

b) another polymer, for example a polyamide, e.g. PA6, PA11, PA12, PA612, PA1010, PA1012, PA1212, PA6, 3T, or a copolyamide based thereon, or a thermoplastic polyester, e.g. polyethylene terephthalate, polybutylene terephthalate, polypropylene terephthalate, polyethylene 2,6-naphthalate, polypropylene 2,6-naphthalate, or polybutylene 2,6-naphthalate, or a copolyester based thereon, or a polyolefin, e.g. polypropylene, or a fluoropolymer;

c) a filler and/or a pigment, such as carbon black, titanium dioxide, glass beads, hollow glass beads, talc, zinc sulfide, a silicate, a carbonate, or an exfoliated or intercalated phyllosilicate;

d) a reinforcing material, such as a glass fiber, an aramid fiber, a whisker or a nanotube, e.g. those based on carbon;

e) an additive which gives the molding composition antistatic properties or electrical conductivity, e.g. a carbon fiber, a graphite fibril, a stainless steel fiber, or conductivity black;

f) a flame retardant, such as magnesium hydroxide, aluminum hydroxide, melamine cyanurate, a phosphorus-containing flame retardant, a brominated aromatic compound, and also a material such as brominated polystyrene or brominated polycarbonate; and g) a conventional auxiliary and/or additive, e.g. plasticizer, wax, antioxidant, UV stabilizer, or nucleating agent.

The molding composition of the invention has high melt stiffness and is therefore easy to blow mold. Flash can readily be removed by cutting or break-off methods. The molding composition nevertheless has good low-temperature impact strength, approximately at the level possessed by conventional polyamide molding compositions.

Methods which may be used for processing the molding composition, other than conventional blow molding, are 3D blow molding, for example by extruding a parison into an open half of a mold, 3D parison manipulation or 3D suction blow molding, or sequential blow molding to produce hard-soft composites, or any other blow molding process.

Other methods which may be used to process the molding composition are coextrusion blow molding, coextrusion 3D blow molding, coextrusion suction blow molding, etc., to give a composite having two or more layers.

The moldings produced are in particular used for motor vehicles or as a component in an automobile, or more generally as a container or line for liquids or gases, or else as a molding required to have good chemicals resistance together with good low-temperature impact strength. Examples of these applications are a tank, tank-filling pipe, coolant fluid line, fuel line, vapor line (i.e. line conveying fuel vapor), expansion tank, cooling system, air intake tube, axle sleeve, or reservoir. These moldings may also have a fuel-components-barrier layer, for example, made from a molding composition based on thermoplastic polyester, or on EVOH or on a fluoropolymer. They may also comprise an electrically conductive layer, based either on the molding composition of the invention or on other polymers. The moldings may also comprise regrind, either as a separate layer or as a component of a blend.

Having generally described this invention, a further understanding can be obtained by reference to certain specific examples which are provided herein for purposes of illustration only, and are not intended to be limiting unless otherwise specified.

Examples

The materials used in the example are as follows:

VESTAMID® ZA 7340: A high-viscosity DEGUSSA-HÜLS AG PA12 with relative solution viscosity $\eta_{rel}$ of 2.1 and with improved melt stiffness.

Polyamine-PA12 copolymer:

49.75 kg of laurolactam were melted in a heating vessel at from 180 to 210° C. and then transferred into a pressure-tight reaction vessel. 5.7 g of a 50% strength solution of $H_3PO_2$ in water, and also 2.5 kg of water, were then added, and the mixture was heated to 280° C. The laurolactam cleavage here was carried out under autogenic pressure. The pressure was then reduced to 10 bar of water-vapor pressure, and 0.250 kg of LUPASOL® G100 (a BASF AG polyethyleneimine) were then added. The reaction mixture was stirred under autogenic pressure for 30 minutes, and the pressure on the mixture was then reduced to atmospheric pressure, followed by polycondensation for 2 h under a stream of nitrogen.

The clear melt was discharged via a melt pump, cooled in a water bath, pelletized and dried, and then postcondensed in the solid phase in a stream of nitrogen at a temperature of 160° C.

| | |
|---|---|
| Crystalline melting point $T_m$: | 175° C. |
| $\eta_{rel}$: | 2.2 |
| Concentration of amino groups: | 90 mmol/kg |
| Concentration of terminal carboxyl groups: | 20 mmol/kg |

TABLE 1

Melt viscosities of molding compositions used, measured in a mechanical rheometer (cone-and-plate) at 250° C.

| | Viscosity at 0.1 1/s [Pa · s] | Viscosity at 100 1/s [Pa · s] | Viscosity ratio |
|---|---|---|---|
| VESTAMID ® ZA 7340 | 6,200 | 1,700 | 3.6 |
| Polyamine-PA12 copolymer | 79,000 | 2,600 | 30 |

The results in Table 1 show that the viscosity of the copolymer of the invention at a shear rate of 0.1 1/s (approximately typical for a parison outside the extrusion die) is considerably higher than that of VESTAMID® ZA 7340. In contrast, the melt viscosity at a shear rate of 100 l/s (approximately typical for the melt within the extrusion die) is higher by a factor of only 1.5.

Example 1

Bottles of volume 0.5 l were produced on a Krupp Kautex model KEW 401. The process was composed of the following procedures in chronological sequence one after the other:

parison extrusion mold advances and encloses the parison chopper severs parison mold withdraws blowing mandrel is introduced vertically into the mold blowing procedure opening of mold and ejection of molding.

The clear superiority of the copolymer of the invention is seen here. With VESTAMID® ZA 7340 the parison sagged under its own weight, and cutting gave a residue of the molding composition on the knife (leading to incomplete shaping of the neck of the bottle), but these problems were not found with the copolymer.

German patent application 10064338.8 filed Dec. 21, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A molding composition, comprising:
   at least 50% by weight of a polyamine-polyamide copolymer;
   wherein the polyamine-polyamide copolymer is obtained from the following monomers:
   a) from 0.05 to 2.5% by weight of a polyamine having at least 4 nitrogen atoms based on the polyamine-polyamide copolymer, and
   b) a polyamide-forming monomer selected from the group consisting of a lactam, ω-aminocarboxylic acid, an equimolar combination of a diamine and a dicarboxylic acid and mixtures thereof;
   wherein the polyamine-polyamide copolymer has the following properties:
   a viscosity of at least 5 000 Pa•s at 250° C. and at a shear rate of 0.1 l/s; and
   a viscosity ratio of at least 7 at 250° C., when the melt viscosities at shear rates of 0.1 l/s and 100 l/s are compared with one another.

2. The molding composition according to claim 1, wherein the polyamine is a dendrimer or a branched polyethyleneimine.

3. The molding composition according to claim 1, wherein the polyamine-polyamide copolymer is prepared by additionally using an amount of oligocarboxylic acid selected from the group consisting of 0.01 to 0.5 mol % of dicarboxylic acid and 0.01 to 0.2 mol % of tricarboxylic acid, based in each case on the entirety of the polyamide-forming monomers of b).

4. The molding composition according to claim 1, wherein the viscosity ratio is at least 9 at 250° C.

5. The molding composition according to claim 1, wherein the viscosity ratio is at least 12 at 250° C.

6. A method, comprising:
   blow molding the composition according to claim 1.

7. The method according to claim 6, wherein the blow molding is conventional blow molding, 3D blow molding or sequential blow molding.

8. A blow-molded article which comprises the molding composition according to claim 1.

9. The blow-molded article according to claim 8, wherein the article comprises two or more layers.

10. The blow-molded article according to claim 9, wherein the article has a fuel-component-barrier layer.

11. The blow-molded article according to claim 8, wherein the article comprises an electrically conductive layer.

12. The blow-molded article according to claim 8, wherein the article comprises regrind, either as a separate layer or as a component of a blend.

* * * * *